United States Patent [19]

Kohler

[11] Patent Number: 5,176,227
[45] Date of Patent: Jan. 5, 1993

[54] RAILWAY SERVICE AND PARKING BRAKE ACTUATOR

[75] Inventor: William H. Kohler, Ringwood, N.J.

[73] Assignee: Tec Tran Corporation, Mahwah, N.J.

[21] Appl. No.: 739,338

[22] Filed: Aug. 1, 1991

[51] Int. Cl.⁵ .......................................... B61H 13/00
[52] U.S. Cl. ........................................ 188/59; 92/24; 92/27; 188/72.4; 188/71.8; 188/153 R; 188/196 P; 188/198; 188/265
[58] Field of Search ................. 188/58, 59, 72.4, 72.5, 188/72.6, 153 R, 153 D, 153 A, 265, 67, 198–203, 196 P, 196 R, 216, 106 P, 106 R, 71.8, 72.3; 303/89; 92/27, 24, 25; 91/44, 41, 43, 45; 192/114 R

[56] References Cited

U.S. PATENT DOCUMENTS

| Re. 29,096 | 1/1977 | Jones | 303/100 |
|---|---|---|---|
| 1,363,314 | 12/1928 | Cosgrove . | |
| 1,754,132 | 4/1930 | Bekkum . | |
| 2,228,244 | 1/1941 | Baker | 166/1 |
| 2,861,658 | 11/1958 | Bouvat-Martin | 188/196 |
| 2,902,256 | 9/1959 | Gustafsson | 254/106 |
| 3,172,297 | 3/1965 | Thiene | 74/148 |
| 3,597,016 | 8/1971 | Gachot et al. | 188/265 X |
| 3,746,403 | 7/1973 | Jones et al. | 303/89 |
| 3,995,722 | 12/1976 | Jones et al. | 188/71.9 |
| 4,058,084 | 11/1977 | Kawaguchi et al. | 188/196 P X |
| 4,083,436 | 4/1978 | Straut | 188/265 |
| 4,175,793 | 11/1979 | Clemmons | 188/153 R X |
| 4,382,492 | 5/1983 | Ritsema | 188/196 P X |
| 4,429,777 | 2/1984 | Taig | 192/111 |
| 4,586,425 | 5/1986 | Redman et al. | 92/27 X |
| 4,867,283 | 9/1989 | Dill | 188/196 |

FOREIGN PATENT DOCUMENTS

59778 5/1942 Denmark .
948053 7/1949 France .
666332 6/1959 U.S.S.R. .

Primary Examiner—Douglas C. Butler
Attorney, Agent, or Firm—David A. Greenlee

[57] ABSTRACT

A brake actuator for a railway brake which provides both service and parking braking comprises a cylinder having an operating cavity. A piston assembly extends into the operating cavity and has a stepped bore including second and smaller third cavities. A first hydraulic supply admits pressurized hydraulic fluid into the operating cavity to extend the piston assembly to apply the service brake. A spring applies a retracting force on the piston smaller than the hydraulic force. A hollow parking brake piston carried in the second cavity extends to react against the cylinder and extend the piston assembly in response to the supply of pressurized fluid to the second cavity from a second hydraulic supply to apply the parking brake. A mechanical lock, comprising a one-way clutch utilizing ramps and rollers, locks the piston extended from the piston assembly cylinder to maintain the parking brake applied upon removal of the second hydraulic supply force. An unlocking member is responsive to the supply of pressurized fluid to the third cavity from a third hydraulic supply to disable the clutch and enable the spring to retract the parking brake piston and the piston assembly to release the parking brake. A gripper ring grips the exterior of the piston assembly with a friction force which enables slippage on the piston assembly upon engagement with a cylinder abutment upon extension to provide adjustment for brake wear. Ring engagement with another cylinder abutment limits piston assembly retraction to provide slack.

24 Claims, 8 Drawing Sheets

RAILWAY SERVICE AND PARKING BRAKE ACTUATOR

BACKGROUND OF THE INVENTION

This invention relates generally to actuators for railway hydraulic braking systems and, more particularly, to an actuator for applying the service and parking brakes in such systems.

Railway braking systems have traditionally been operated by pneumatic actuators. These air brake systems are still in common use on long distance railways and on many subway systems. Such air brake systems are effective, but lack the ability to modulate braking effort sufficiently to provide consistently smooth stops.

Recently, braking requirements for rapid transit railway cars have resulted in the development of hydraulic friction service braking systems which are controllable to provide the desired smooth stops. Such a hydraulic braking system is disclosed in U.S. Pat. No. Re 29,096 to Jones. This patent relates a hydraulic friction braking system and a control system of a type currently in use on Washington Metropolitan Area Transit Authority (WMATA) transit cars. This system employs a brake actuator which hydraulically applies and releases the service brakes.

Parking brakes are required to apply and maintain the brakes applied for extended periods when the railway car is out of service and parked. Parking brake actuators have traditionally been mechanically applied and held. A hydraulic parking brake actuator has been developed, for use in the WMATA braking system, as shown in U.S. Pat. No. 4,083,436 to Straut. In this actuator, hydraulic pressure is utilized to extend a piston and apply the parking brake, while a mechanical lock holds the parking brake engaged. This mechanical lock is hydraulically released to enable a spring to retract the piston and release the brake.

In the Straut arrangement, a railway hydraulic actuator assembly includes separate actuators for applying both the service and parking brakes of a railway car. The service brake actuator applies the service brakes by spring force applied through service brake pistons; application of hydraulic pressure fluid supplied from a pump-fed accumulator releases the brakes.

A separate actuator applies the parking brake via hydraulic pressure created by a hand pump acting on a separate parking brake piston. The brake is held applied by a mechanical lock comprising a complex friction clutch which locks the piston extended when hydraulic pressure is removed; hydraulic pressure is again utilized to release the friction clutch and enable spring force to retract the piston and release the brake.

Although hydraulic railway service and parking brake actuators according to the above patents have been used successfully for many years, they are unduly bulky, complex and expensive to purchase and maintain. Accordingly, it would be desirable to reduce the complexity of railway hydraulic brake actuators.

Also, it would be desirable to provide a hydraulic railway service brake actuator having a slack adjustor of less complexity than the automatic rotary slack adjustor having a sprag clutch.

Further, it would be desirable to provide a parking brake actuator having a mechanical lock of reduced complexity.

In addition, it would be desirable to combine the parking brake and service brake actuators into a single actuator.

SUMMARY OF THE INVENTION

It is therefore an object of this invention to provide a railway hydraulic brake actuator of reduced complexity.

Another object of this invention is to provide a hydraulic railway service brake actuator having a slack adjustor of less complexity than the automatic rotary slack adjustor having a sprag clutch.

A further object of this invention is to provide a parking brake actuator having a mechanical lock of reduced complexity.

A yet further object of this invention is to provide a railway hydraulic brake actuator which combines the parking brake and service brake actuators into a single actuator.

In one aspect, this invention features a brake actuator for operating a railway brake, comprising a cylinder having an operating cavity with open and closed ends, and a piston assembly extending through the open end into the cavity and having a reaction surface adjacent the cylinder closed end. The actuator is connected to the brake such that extension of the piston from the cylinder applies the brake and retraction of the piston within the cylinder releases the brake. A gripper ring carried by the cylinder grips the exterior of the piston assembly with a frictional force to enable movement together. A spring for retracting the ring and piston assembly engages the ring with a retraction force smaller than the frictional force.

A first abutment on the cylinder engages the ring upon retraction to limit retracting movement. A hydraulic supply admits pressurized hydraulic fluid into the operating cavity between the closed end and the reaction surface to extend the piston assembly with a force greater than the frictional force to apply the brake and provide a service brake. A second abutment on the cylinder engages the ring upon extension to limit extending movement of the ring by the hydraulic force while permitting continued movement of the piston assembly to apply the brake. The limited retracting movement of the ring provides brake slack, while movement of the piston assembly relative to the ring upon extension compensates for brake wear.

In another aspect, this invention features a parking brake actuator having a cylinder, a piston carried by the cylinder, a hydraulic supply for admitting pressurized hydraulic fluid to the cylinder to extend the piston from the cylinder to apply a parking brake, and a spring for retracting the piston within the cylinder upon removal of a hydraulic extending force to release the parking brake. A mechanical lock is provided for locking the piston in extended position to maintain the parking brake applied upon removal of the hydraulic extending force, and unlocking means are provided for disabling the mechanical lock to unlock the piston and enable retraction of the piston.

The mechanical lock comprises an inner cylindrical surface carried by the piston and a carrier member carried within the piston and attached to the cylinder for movement therewith. A ramp is formed on the carrier member and tapered inwardly toward the direction of extension. A rotary locking member is wedged between the piston inner cylindrical surface and the ramp, and a second spring means biases the rotary locking member into wedged position to lock the piston against retraction but permit its extension.

The unlocking means comprises an unlocking member movable relative to the carrier member to move the rotary locking member out of wedged position. Pressurized fluid from a second hydraulic supply causes the unlocking member to force the rotary locking member out of wedged position. This enables the first spring means to retract the piston and release the brake.

In yet another aspect, this invention features such a parking brake actuator in which the rotary locking members are rollers which are contoured to match the piston inner cylindrical surface. The ramps are circumferentially spaced and contoured to match the roller contour. The second spring means comprise a circular reaction ring attached to the carrier member, a retainer of anti-friction material engaging each roller, and a compression spring confined between each retainer and the ring.

In still another aspect, this invention features a brake actuator for operating a railway brake system which provides both service and parking braking. The actuator comprises a cylinder having an operating cavity with open and closed ends and a piston assembly which extends through the open end into the cavity and has a reaction surface adjacent the cylinder closed end. The actuator is connected to the brake such that extension of the piston from the cylinder applies the brake and retraction of the piston within the cylinder releases the brake.

A first hydraulic supply admits pressurized hydraulic fluid into the operating cavity between the closed end and the reaction surface to exert a first hydraulic extension force to extend the piston assembly and apply the brake to provide a service brake. A spring exerts a retracting force smaller than the hydraulic force on the piston assembly.

A second cavity is formed in the piston assembly and receives a parking brake piston. A second hydraulic supply admits pressurized hydraulic fluid into the second cavity to extend the parking brake piston which extends the piston assembly with a second hydraulic extension force and apply the brake to provide a parking brake.

A mechanical lock mechanically locks the parking brake piston extended to maintain the piston assembly extended and the parking brake applied in the absence of any hydraulic extension forces. Unlocking means including a third hydraulic supply is provided to unlock the piston and enable the spring to retract the piston assembly and release the parking brake.

In a further aspect, this invention more specifically features a brake actuator that provides both service and parking braking for a railway brake, which comprises a cylinder having a cylindrical operating cavity with open and closed ends, a cylindrical piston assembly extending through the open end of the cylinder into sealing engagement with the cavity and having a reaction surface adjacent the cylinder closed end.

The actuator is connected to the brake such that extension of the piston from the cylinder applies the brake and retraction of the piston within the cylinder releases the brake. A first hydraulic supply is provided for admitting pressurized hydraulic fluid through the cylinder into the operating cavity between the closed end and the piston assembly reaction surface to exert a hydraulic force extending the piston assembly which applies the brake to provide a service brake. A spring exerts a retracting force smaller than the hydraulic extension force on the piston assembly.

The piston assembly has a stepped bore including a second and smaller third cavities. A hollow parking brake piston having an inner surface and a cylindrical outer surface is sealingly received within the second cavity. A second hydraulic supply is provided for admitting pressurized hydraulic fluid through the piston assembly into the second cavity to extend the parking brake piston to react against the cylinder closed end. This extends the piston assembly and applies the brake to provide a parking brake.

A mechanical lock locks the parking brake piston in extended position to maintain the parking brake applied upon removal of hydraulic extension force. The mechanical lock includes a carrier member attached to the piston assembly and located within the second cavity. A plurality of circumferentially-spaced ramps are formed on the carrier member and tapered inwardly toward the direction of parking brake piston extension. A rotary locking member is wedged between the parking brake piston inner surface and each ramp. A spring biases the rotary locking members into wedged position to lock the parking brake piston against retraction, while permitting its extension.

An unlocking member including an operating piston sealingly received in the third cavity is responsive to pressurized hydraulic fluid supplied from a third hydraulic source to force the rotary locking members out of wedged position. This unlocks the piston and enables retraction of the parking brake piston within the piston assembly.

In a yet further aspect, this invention more specifically features such a brake actuator that includes a gripper ring carried by the cylinder which grips the exterior of the piston assembly with a frictional force to enable movement together. The first spring engages the ring with a retracting force smaller than the frictional force.

Upon extension, the ring engages a first abutment on the cylinder which limits retraction of the piston assembly and ring by the spring means. The ring engages a second abutment on the cylinder upon extension which limits extension of the ring by the hydraulic force while permitting continued movement of the piston assembly relative to the ring to apply the brake. The limited retraction of the ring and piston assembly provides brake slack, and movement of the piston assembly relative to the ring upon extension compensates for brake wear.

These and further objects and features of this invention will become more readily apparent upon reference to the following detailed description of a preferred embodiment, as illustrated in the accompanying drawings, in which:

DETAILED DESCRIPTION OF A PREFERRED EMBODIMENT

Figure 1:
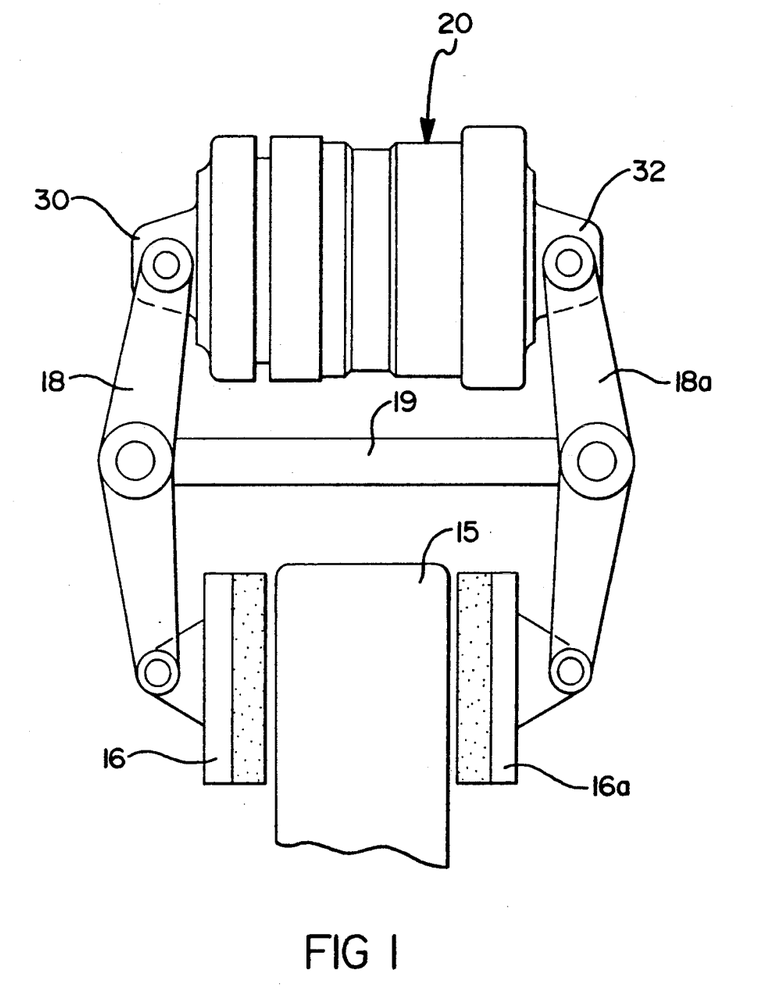
FIG. 1 is a schematicized general arrangement view of a railway friction disc braking system employing a hydraulic service and parking brake actuator according to this invention.

Referring now to FIG. 1 of the drawings, a friction disc braking system for a railway car (not shown) includes a disc 15 conventionally mounted on a wheel (not shown). A pair of friction material brake pads 16, 16a are mounted on opposite sides of disc 15. A pair of operating arms 18, 18a are pivotally mounted on an interconnecting reaction link 19 and connect pads 16, 16a to a railway brake actuator 20, according to this invention.

Figure 2:
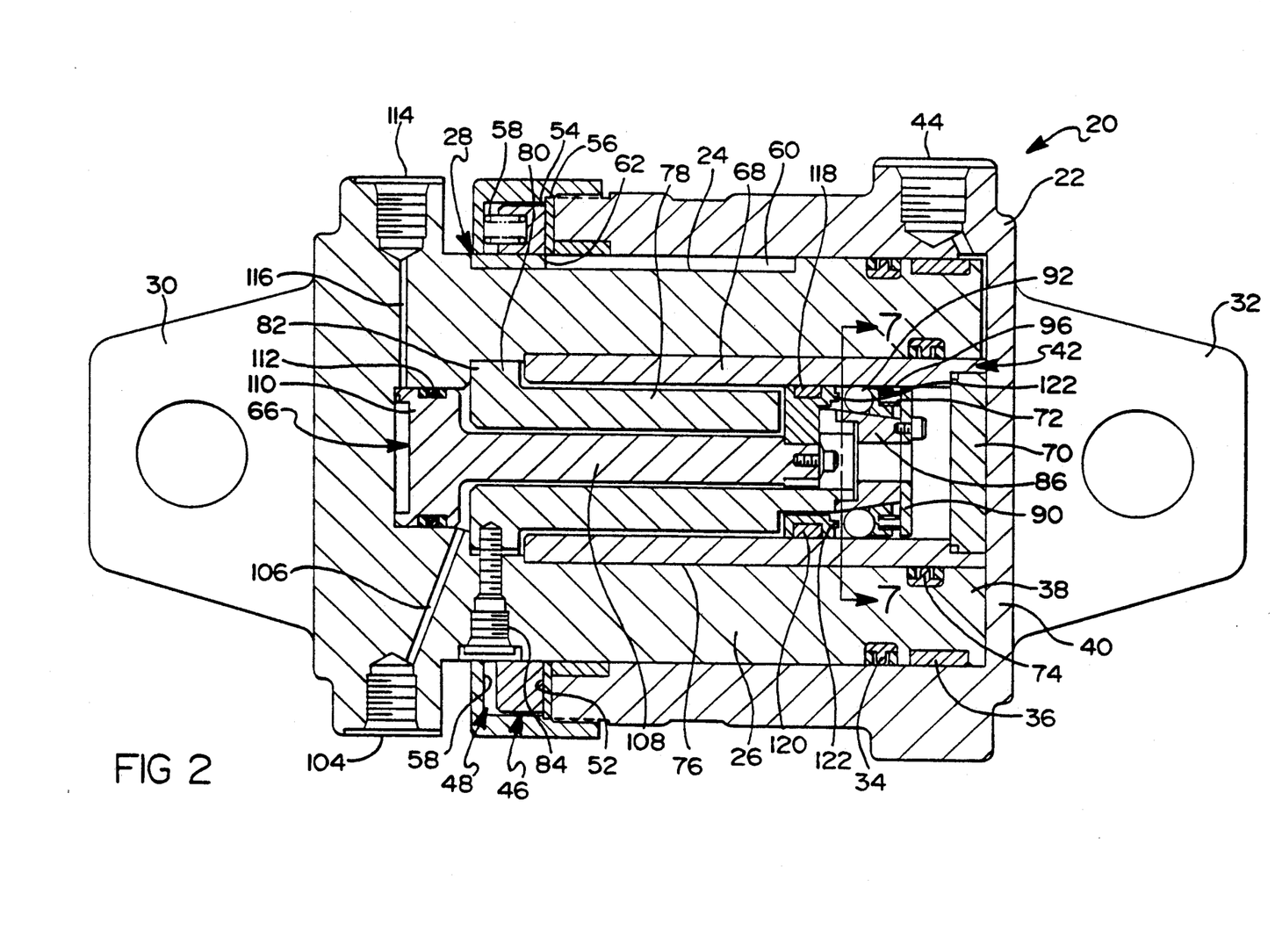
FIG. 2 is an axial sectional view of the brake actuator shown in FIG. 1, illustrated in the brake-released position unadjusted for worn brake friction material.

Referring additionally to FIG. 2, actuator 20 comprises a housing, or cylinder, 22 which has a cylindrical operating cavity, or bore 24. A cylindrical piston assembly 26 extends through the open end 28 of bore 24 and includes an apertures mounting ear 30 for attachment to operating link 18. Similarly, cylinder 22 includes a mounting ear 32 for attachment to operating link 18a.

Upon extension of piston assembly 26 from cylinder bore 24, operating links 18, 18a will pivot on reaction link 19 to squeeze disc 15 between pads 16, 16a and apply the brakes. Conversely, retraction of piston assembly 26 within cylinder 22 will release the brakes. This general arrangement is conventional.

The cylinder and piston assembly can be of steel or aluminum, depending on weight requirements. Actuator 20 incorporates a service brake actuator and a parking brake actuator in a single unit. Structure necessary to service brake operation will now be described. Piston assembly 26 is sealed within cylinder bore 24 by an annular pressure seal 34. A wear ring 36 is provided at the inner end 38 of piston assembly 26. This enables piston assembly inner end 38 and cylinder end wall 40 to form a sealed operating chamber 42.

A hydraulic port 44 is formed in cylinder 22 for alternate connection of operating chamber 42 to a source of pressurized hydraulic fluid and to a drain (neither shown) in a well-known manner. Such a source normally comprises a pump-fed pressure accumulator. Pressure fluid in operating chamber 42 will act on inner end 38 with a predetermined force to extend piston assembly 26. A hydraulic pressure of 350-450 p.s.i. is conventional; with an effective area of the end of the piston assembly of 10 sq. in., the extension force will be 3500-4500 pounds.

A cap 46 is threaded onto the open end of cylinder 22 and includes an annular groove 48 located peripherally about bore 24. Groove 48 is defined by an integral outer abutment wall 50 and a confined annular ring forming an axially-spaced inner abutment wall 52. Groove 48 confines a gripper ring 54 which encircles and grips the periphery of piston assembly 26 with a predetermined friction force. An exemplary gripper friction force is 80 pounds. Thus, the ring and piston assembly normally move together as a unit.

Gripper ring 54 includes twelve circumferentially-spaced axial pockets 56 which each confine a compression spring 58 between ring 54 and groove outer wall 50. Springs 58 comprise first spring means which exert an axial retraction force on gripper ring 54 and piston assembly 26 that is smaller than the friction force by which ring 54 grips piston assembly 26. The spring retraction force (60 pounds, for example) is also smaller than the hydraulic extension force.

The manner and means of providing and controlling hydraulic pressure fluid for the purpose of applying and releasing service brakes is well-known and forms no part of this invention. Operation of service brake actuation will now be described in reference to FIGS. 2 and 3.

Figure 3:
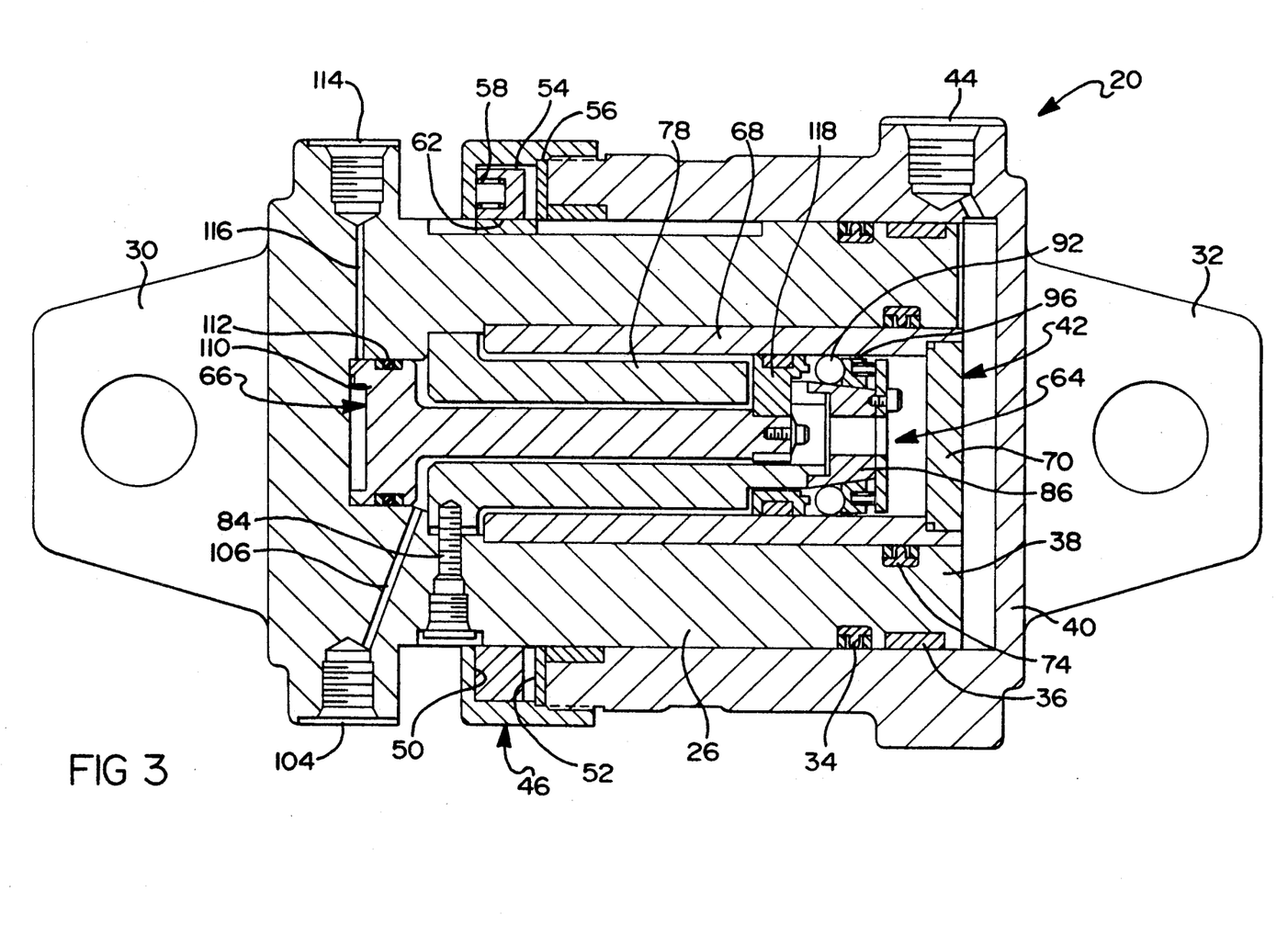
FIG. 3 is a view similar to FIG. 2, but with the brake actuator illustrated in the service brake applied position.

The brakes are applied by connecting port 44 to a hydraulic pressure fluid source to pressurize operating chamber 42 and extend the piston assembly 26. As piston assembly 26 extends, the brake is applied and springs 58 are compressed until the FIG. 2 position is reached, where ring 54 is shown abutting groove wall 50. This abutment does not limit travel of piston assembly 26, as will be later described in reference to wear compensation. Since the force of compressing springs 58 is less then the friction force of griper ring 54, the ring and piston assembly move as a unit.

To release the brake, port 44 is connected to drain to remove pressure in chamber 42. This enables springs 58 to retract the ring 54 and piston assembly 26 until ring 54 abuts groove wall 52, as illustrated in FIG. 2. The friction force of ring 54 maintains piston assembly 26 in this position. The distance traveled by ring 54 and piston assembly 26 during retraction is the amount of brake slack. Brake slack equals the amount by which the axial distance between walls 50 and 52 exceeds the axial thickness of gripper ring 54 and can be varied by changing the axial width of annular 48 groove or changing gripper ring 54.

The sequence of operation of the service brake just described in reference to FIGS. 2 and 3 is illustrative of operation with brakes having new, unworn friction material. Operation under conditions of friction material wear will now be described with added reference to FIGS. 4 and 5.

Figure 4:
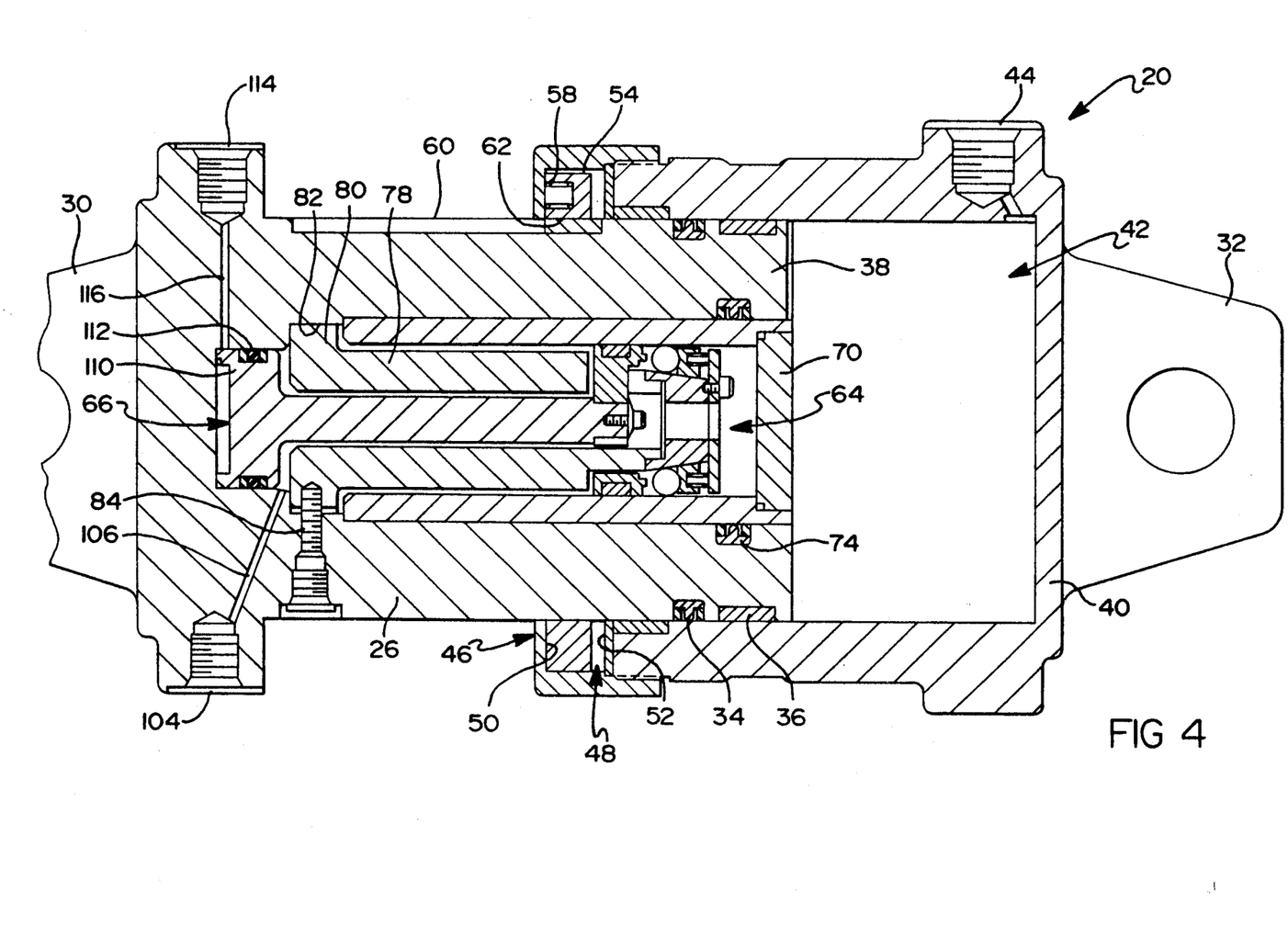
FIG. 4 is a view similar to FIG. 3, with the brake actuator, but illustrated in the service brake applied position as automatically adjusted for worn brake friction material.

As the friction material in the brakes wears, piston assembly 26 must extend further from cylinder 22 to apply the brakes. FIG. 4 illustrates the extension of piston assembly 26 needed to apply the brakes. In an exaggerated illustrative example, application of the service brake from a FIG. 2 position where it has worn friction material is accomplished as follows. Connection of port 44 to a pressure fluid source will pressurize chamber 42 and extend piston assembly 26 and ring 54 initially to the FIG. 3 position, where ring 54 will abut outer groove wall 50. Since the hydraulic extension force is greater than the friction force exerted by gripper ring 54, the ring will stop, while the piston assembly will slide on the ring and continue to extend until the brakes are applied, as illustrated in FIG. 4.

Figure 5:
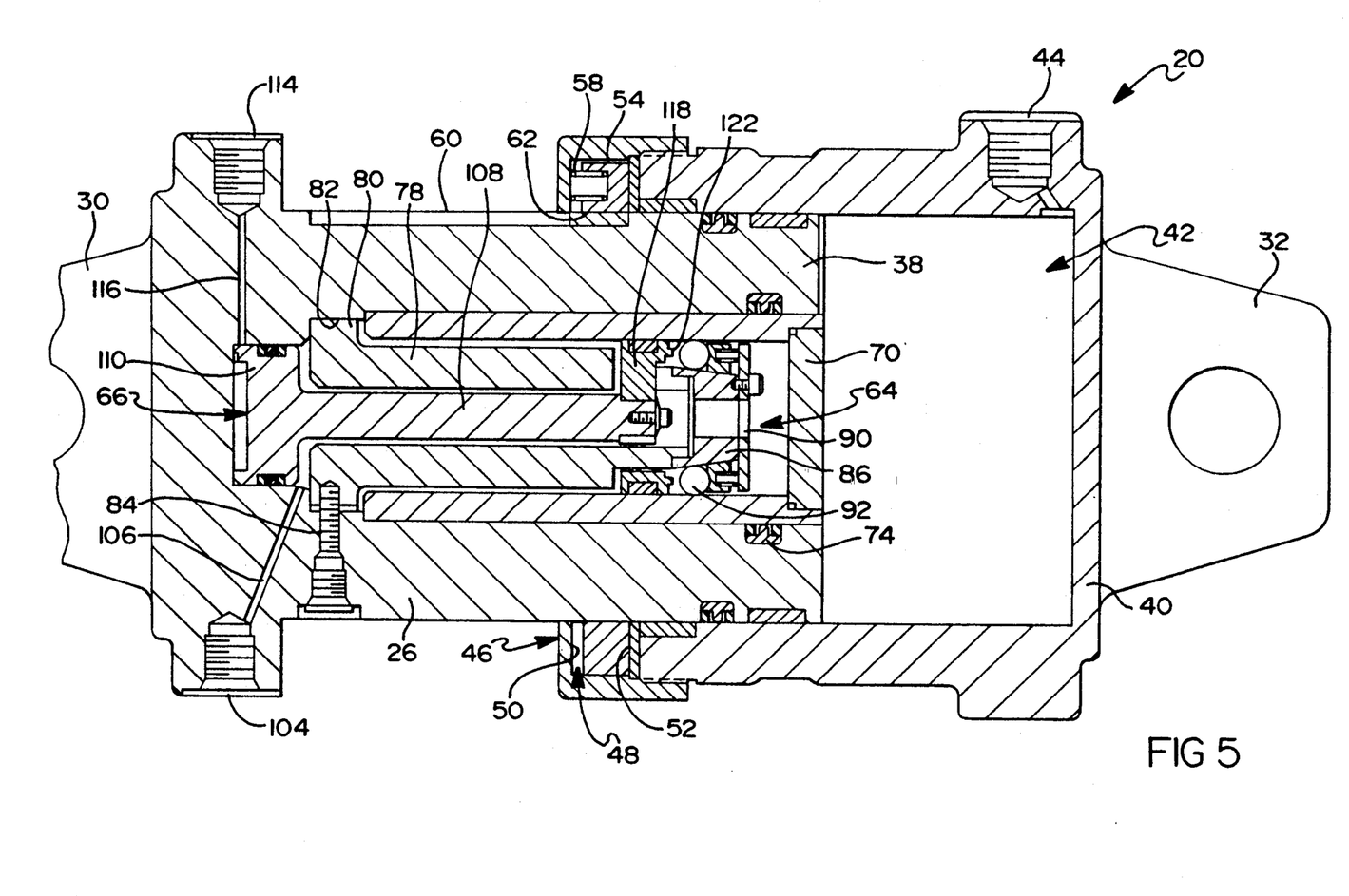
FIG. 5 is a view similar to FIG. 4, but with the brake actuator illustrated in the brake released position as automatically adjusted for worn brake friction material.

When the brakes are to be released, port 44 is connected to drain. Pressure in chamber 42 will drop to zero and springs 58 will retract ring 54 into abutment with wall 52. The friction force of gripper ring 54 will stop piston assembly 26 from retracting further. Thus piston assembly 26, due to its attachment to ring 54, will automatically retract the same distance, regardless of the degree of wear of the friction material. This provides a uniform amount of slack for the service brake throughout the life of the friction material through automatic wear adjustment.

As a safety measure, piston assembly 26 includes an axial keyway 60 which receives a key 62 mounted on cylinder 22. Key 62 serves as a stop limiting axial extension of piston assembly 26 to prevent accidental separation of actuator 20 should chamber 42 be pressurized in the absence of friction material pads or shoes.

Structure necessary to parking brake actuation will now be described in reference to FIGS. 5 through 14. Piston assembly 26 includes a stepped bore comprising a second operating chamber 64 (see FIGS. 6 and 7) and a smaller third operating chamber 66. A cylindrical parking brake piston 68 is received in chamber 66 and includes a threaded end closure plate 70 that confines a sealing O-ring 72.

Figure 6:
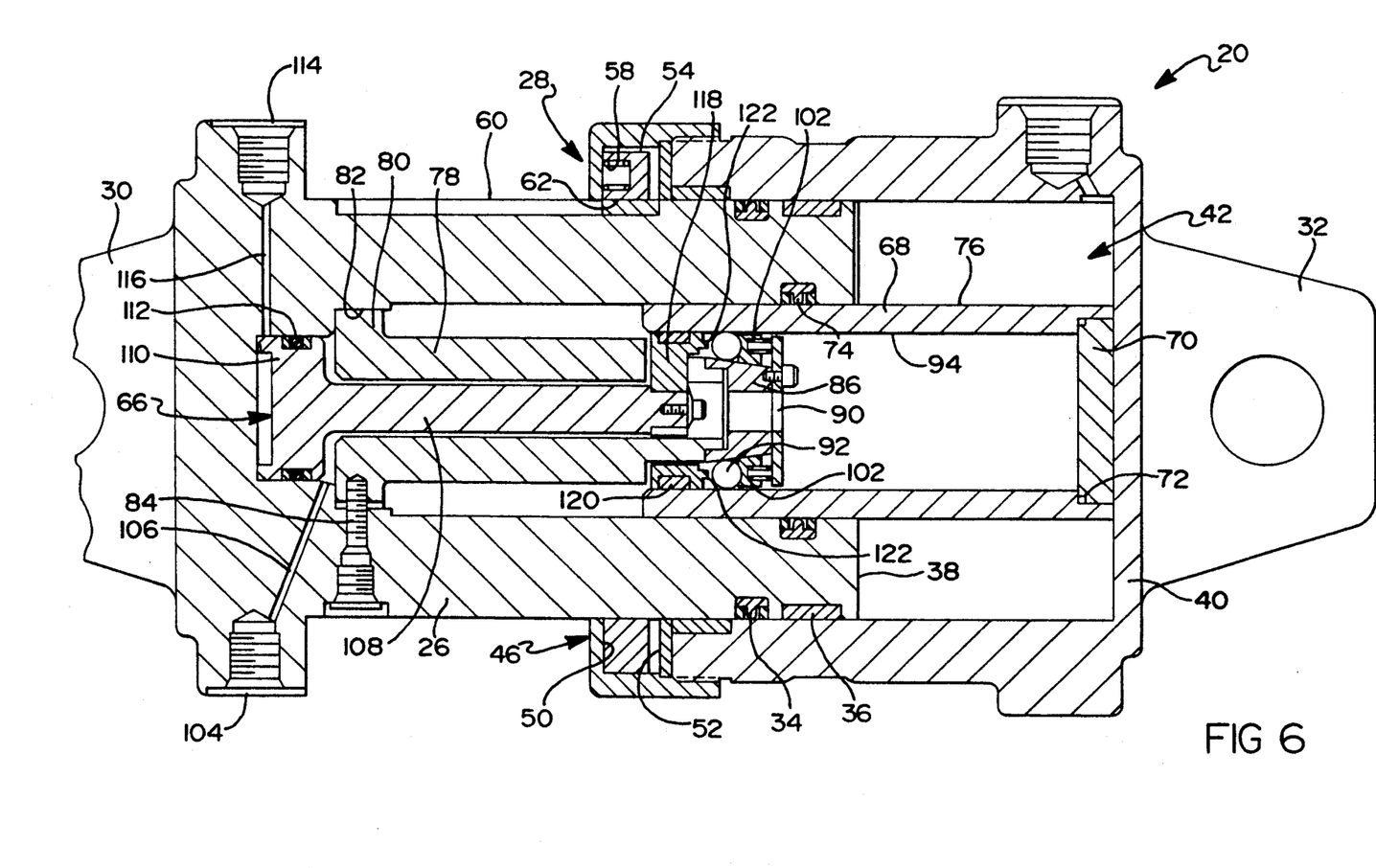
FIG. 6 is a view similar to FIG. 4, but illustrated in the parking brake applied position as automatically adjusted for worn brake friction material.
Figure 7:
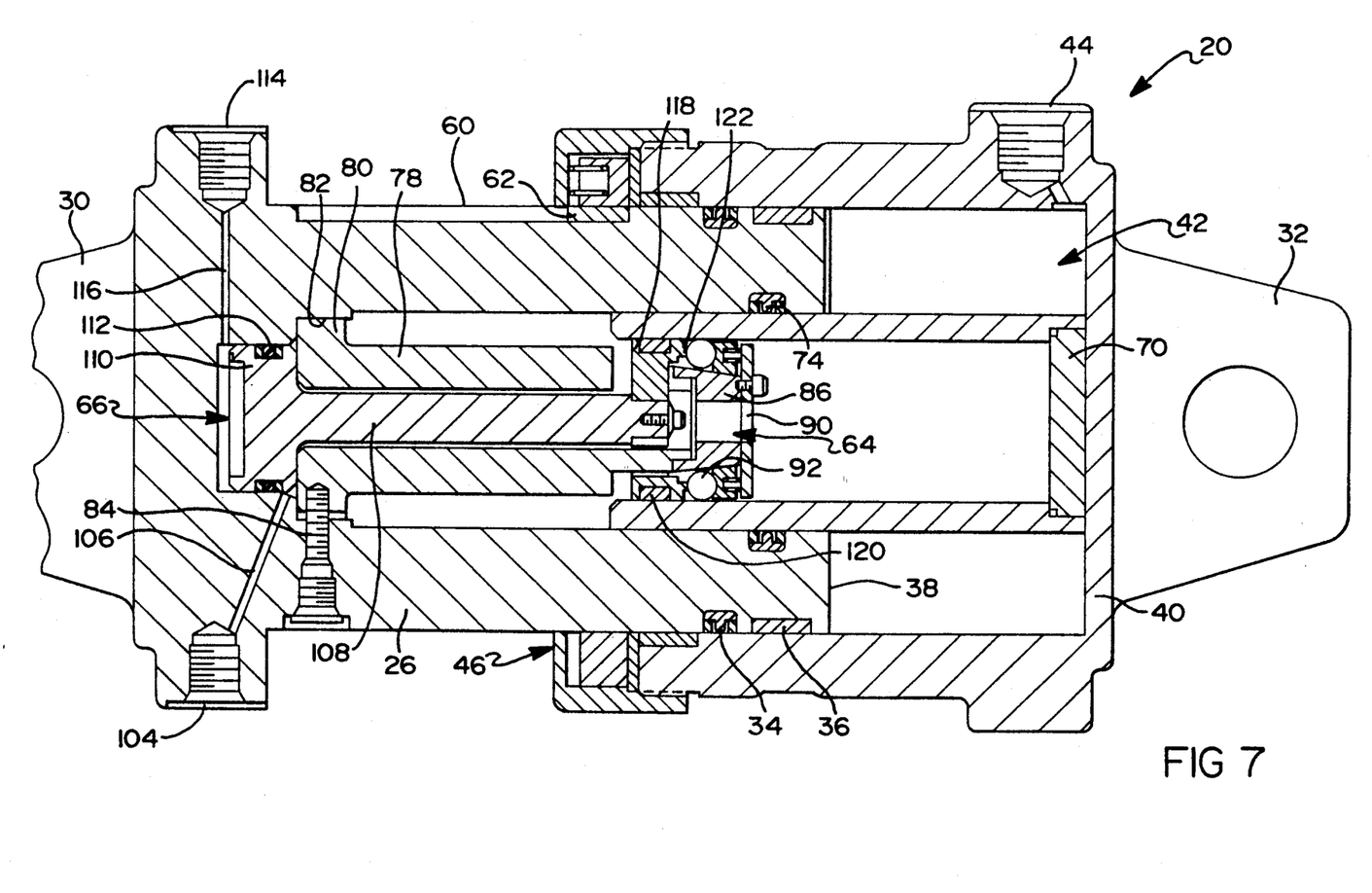
FIG. 7 is a view similar to FIG. 6, but with the brake actuator illustrated in the parking brake released position as automatically adjusted for brake friction material wear.

Piston assembly 26 carries an inner annular pressure seal 74 that engages the outer surface 76 of piston 68 to enable pressurization of the second operating chamber 64. A cylindrical carrier member 78 has an annular base flange 80 that is received in an annular land 82 interconnecting the second and third operating chambers 64 and 66. Carrier member 78 is secured to piston assembly 26 by a screw 84.

Figure 8:
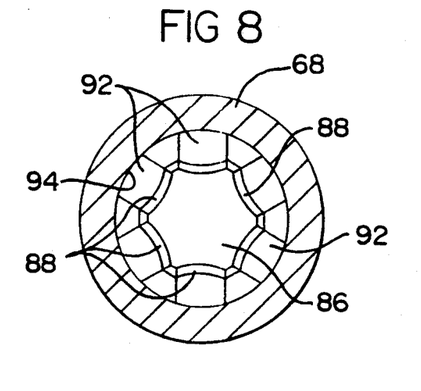
FIG. 8 is a sectional view taken along line 8—8 of FIG. 2, illustrating a ramp roller type of one-way clutch utilized to mechanically lock the parking brake in applied position.

At its outer end, carrier member 78 mounts a ramp sleeve 86. As shown in FIG. 8, six annularly-spaced ramps 88 are formed in the surface of sleeve 86. A reaction ring 90 is bolted to the outer end of ramp sleeve 86. Locking rollers 92 are confined between the ramps 88 and the inner surface 94 of piston 68 and are contoured to match its curvature. The ramps are similarly contoured and have a wedge angle of 7°–8°.

Figure 9:
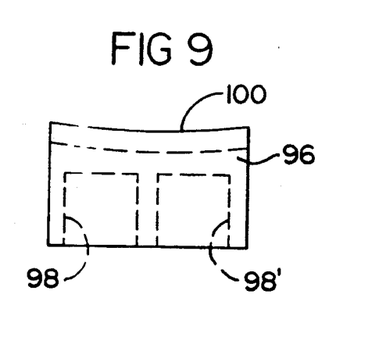
FIG. 9 is an enlarged plan view of a retainer for the rollers shown in FIG. 8.
Figures 10, 11, 12, 13, 14:
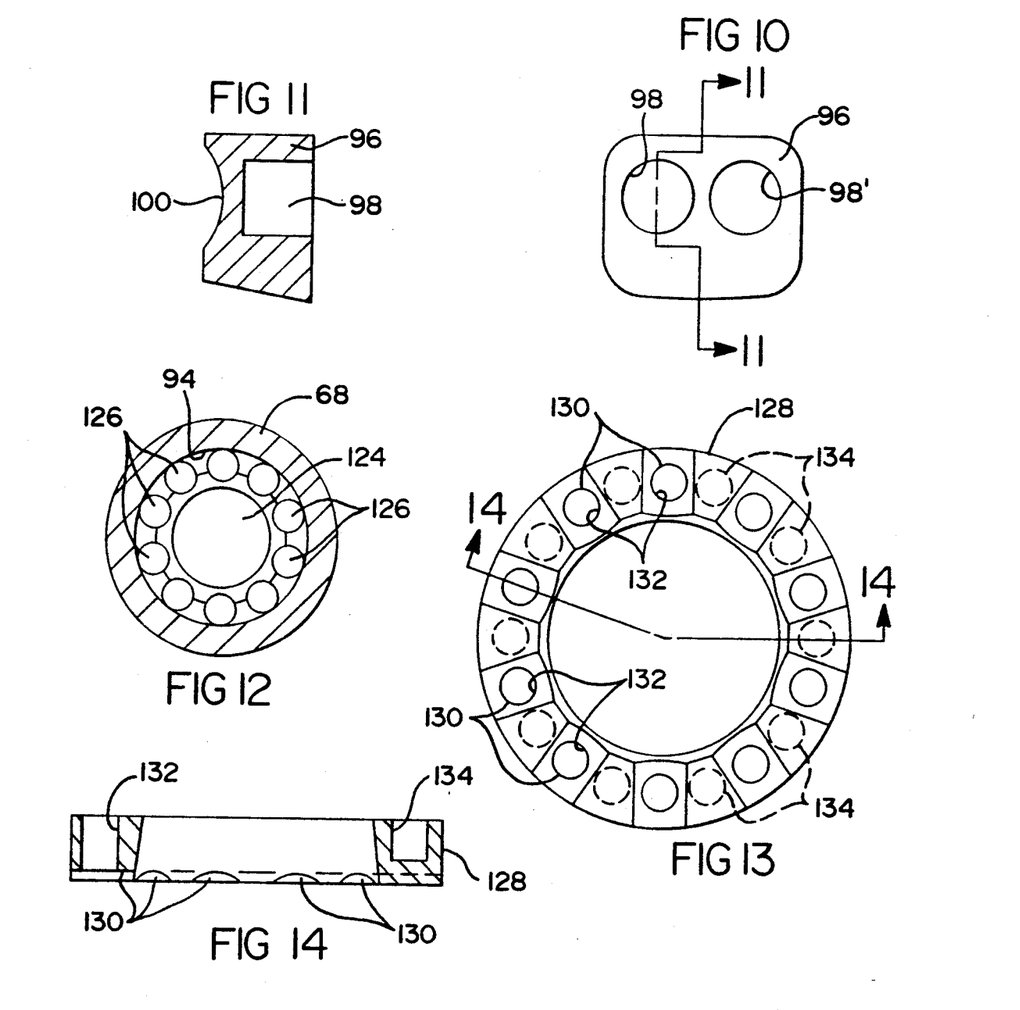
FIG. 10 is a front view of the retainer of FIG. 9.
FIG. 11 is a sectional view taken along line II—II in FIG. 10.
FIG. 12 is a view similar to FIG. 8, but illustrating an alternative embodiment which utilizes balls instead of rollers.
FIG. 13 is an enlarged view of a retainer for the balls shown in FIG. 12.
FIG. 14 is a sectional view taken along the line 14—14 of FIG. 13.

As shown in FIGS. 9–11, each roller is provided with a retainer 96 made of low friction plastic which includes a pair of spring pockets 98, 98′. The front surface 100 of each retainer is contoured to match the roller contour. As shown in FIGS. 2–6, compression springs 102 mount in the pockets 98, 98′ and react against reaction ring 90 to wedge rollers 92 between ramps 88 and piston inner surface 94.

This arrangement 78–102 comprises a one-way, or overrunning, clutch in which rollers 92 prevent piston 68 from retracting within piston assembly, but freely permit its extension. A second hydraulic port 104 in piston assembly 26 is provided for supplying pressure fluid to the second operating chamber 64 via drilled passage 106. The source of pressure fluid is preferably as disclosed in the aforementioned Straut patent, where a hand pump is utilized to provide fluid at up to 4900 p.s.i. to chamber 64 to extend piston 68.

An unlocking member 108 includes an enlarged piston 110 that is received within the third operating chamber 66. Peripheral O-rings 112 provide a pressure seal for chamber 66, which is connected to a third hydraulic port 114 by a drilled passage 116. Chamber 66 may be pressurized from the hand pump, as fully explained in the Straut patent, to extend unlocking member 108 from chamber 66.

Unlocking member 108 extends through the center of carrier member, but is not attached to it. A roller actuator 118 is bolted to the outer end of unlocking member 108 and mounts an annular wear ring 120 that engages piston inner surface 94. Roller actuator 118 includes six circumferentially spaced fingers 122, each opposite to one of the six rollers 92. Upon pressurization of chamber 66, unlocking member 108 extends relative to carrier member 78 so that fingers 122 engage and move rollers 92 out of wedging position, as will later be described.

Operation of the parking brake actuator will now be described with reference to FIGS. 5, 6 and 7. Although the illustrated example assumes well-worn friction material, operation is the same with all degrees of friction material wear. Port 104 is connected for pressurization of chamber 64 (preferably in the manner disclosed in the Straut patent) to extend piston 68 from piston assembly 26, as permitted by clutch 78–102, until end plate 70 engages end wall 40. Piston 68 then reacts against end wall 40 to extend piston assembly 26 and apply the brake, as illustrated in FIG. 6. As with service brake operation, any wear in the friction material will be compensated for by movement of piston assembly 26 relative to cylinder 22, as described above.

When a pressure rise indicates that the brake is fully applied, pressure is removed from chamber 64. Since chamber 66 was unpressurized, pressure in chamber 64 has acted to keep piston 110 retracted to hold fingers 122 away from rollers 92. The parking brake is held set by the wedging action of rollers 92, which is assured by springs 102. This prevents any retraction of piston 68.

To release the parking brake, port 114 is connected to pressurize chamber 66. With chamber 64 now unpressurized, piston 110 will overcome the force of springs 102 and extend roller actuator 118 so that fingers 122 unseat rollers, as illustrated in FIG. 7. Since chamber 64 is unpressurized, and if chamber 42 is also unpressurized (service brake pressure off), return springs 48 will force piston 68 within piston assembly 26 while retracting it to create slack.

However, if, as is a normal practice, the service brake is applied during parking brake release, chamber 42 will be pressurized. This will prevent return springs 48 from retracting piston assembly 26; however, pressure in chamber 42 will force piston 68 to retract within piston assembly 26, since rollers 92 are unseated (as in FIG. 6) and there is no opposing pressure in chamber 64. Upon subsequent release of the service brake by depressurizing chamber 42, release springs 48 will return piston assembly 26 to the position illustrated in FIG. 5.

As a modification, if it is desired to always retract the parking brake piston 68 within piston assembly 26 upon parking brake release, a light spring, such as a Belleville spring, can be confined in the third operating chamber 66. Such a spring would maintain a constant bias on unlocking member tending to unseat balls 92.

Thus, upon depressurization of chamber 66 to release the parking brake, with no service brake pressure in chamber 24, such a spring would maintain the rollers unseated. Upon the next service brake application, pressure in chamber 42 would force piston 68 within piston assembly 26. Such a spring would be too weak to overcome the tremendous forces exerted by the brake rigging tending to retract actuator 20, which would apply substantial frictional forces to rollers 92 far in excess of the light spring force.

An alternative embodiment of the one-way clutch 72-102 is shown in FIGS. 12, 13 and 14. In this embodiment ramp sleeve 86 is replaced by a cone sleeve 124 having a conical surface incorporating the wedge angle of 7°-8°. Ten circumferentially-spaced balls 126 replace the rollers 92 and are confined between the piston inner surface 94 and the cone sleeve 124.

The front of a ball-retaining cage 128 contains ten depressions or dimples 130 for the balls 126. The reverse side of cage 28 contains ten spaced through-drilled spring pockets 132 which open into the depressions 130. Ten blind spring pockets 134 are formed on the reverse side intermediate pockets 132. Compression springs are confined within pockets 132 and react against each of the balls 126 individually. Springs are also confined within pockets 134 to react against reaction ring 90 as a unit.

The spring action serves to maintain balls wedged between piston surface 94 and the surface of cone sleeve 124. The springs in pockets 132 assure that each ball is biased into wedging position despite any structural irregularity or wear which would prevent cage from operating all balls together as a unit. This embodiment functions as a one-way clutch to lock piston 68 in the same manner as described above in reference to the embodiment shown in FIGS. 8-11.

While only a preferred and alternative embodiments have been illustrated and described, obvious modifications thereof are contemplated within the scope of this invention and the following claims.

I claim:

1. A brake actuator for operating a railway brake, comprising
    a cylinder having an operating cavity with open and closed ends,
    a piston assembly extending through the open end into the cavity and having a reaction surface adjacent the cylinder closed end,
    means connecting the actuator to the brake such that extension of the piston from the cylinder applies the brake and retraction of the piston within the cylinder releases the brake,
    a gripper ring carried by the cylinder and gripping the exterior of the piston assembly with a frictional force to enable movement therewith,
    spring means engaging the ring and exerting a retracting force on the ring and piston assembly which is smaller than the friction force,
    a first abutment on the cylinder limiting retraction of the ring and piston assembly by the spring means,
    a hydraulic supply for admitting pressurized hydraulic fluid into the operating cavity between the closed end and the reaction surface for extending the piston assembly with a force greater than the friction force and greater than the retracting force to apply the brake and provide a service brake,
    a second abutment on the cylinder limiting extension of the ring upon extension of the piston assembly and ring by the hydraulic force, while permitting continued movement of the piston assembly relative to the ring to apply the brake,
    whereby the limited retraction of the ring provides brake slack, and movement of the piston assembly relative to the ring upon extension compensates for brake wear.

2. The brake actuator of claim 1, wherein the piston assembly includes
    a second cavity formed in the piston assembly,
    a parking brake piston received within the second cavity, a second hydraulic supply for admitting pressurized hydraulic fluid into the second cavity to extend the parking brake piston to react against the cylinder to extend the piston assembly with a second hydraulic extension force greater than the frictional force to apply the brake and provide a parking brake,
    a mechanical lock for locking the parking brake piston extended to maintain the parking brake applied upon removal of hydraulic pressure,
    unlocking means, and
    a third hydraulic supply for supplying pressurized hydraulic fluid to the unlocking means for unlocking the mechanical lock to enable the spring means to retract the piston assembly and release the parking brake.

3. The brake actuator of claim 2, wherein the parking brake piston is cylindrical, having an outer surface engaging the walls of the second cavity and an inner surface, and wherein
    the mechanical lock comprises a carrier member attached to the piston assembly for movement therewith and located within the second cavity, and a one-way clutch connecting the carrier member and the parking brake piston and being normally enabled to lock the parking brake piston against retraction, but permit its extension, and
    the unlocking means comprises an unlocking member movable relative to the carrier member, in response to the supply of pressurized hydraulic fluid by the third hydraulic supply, to unlock the piston by disabling the one-way clutch which enables retraction of the parking brake piston within the piston assembly.

4. The brake actuator of claim 2, wherein the parking brake piston is cylindrical, having an outer surface engaging the walls of the second cavity and an inner surface, and wherein
    the mechanical lock comprises
        a carrier member attached to the piston assembly for movement therewith and located within the second cavity,
        a ramp formed on the carrier member and tapered inwardly toward the direction of piston extension,
        a rotary locking member wedged between the parking brake piston inner surface and the ramp, and
        second spring means biasing the rotary locking member into wedged position to prevent retraction of the parking brake piston but permit its extension, and
    the unlocking means comprises an unlocking member movable relative to the carrier member in response to the supply of pressurized hydraulic fluid by the third hydraulic supply to move the rotary locking member out of wedged position to unlock the piston and enable retraction of the piston assembly.

5. The brake actuator of claim 4, wherein a plurality of ramps are formed on the carrier member in circumferentially spaced relation, a rotary locking member is located between the piston inner surface and each ramp, the second spring means is operative to bias each rotary locking member into wedged position, and the unlocking member is operable in response to the supply of pressurized hydraulic fluid to simultaneously move all of the rotary locking members out of wedged position.

6. The brake actuator of claim 5, wherein the ramps have a wedge angle of 7°-8° and the rotary locking members are rollers.

7. The brake actuator of claim 5, wherein ramps have a wedge angle of 7°-8° and the rotary locking members are balls.

8. A brake actuator for a railway brake to provide both service and parking braking, comprising
- a cylinder having a cylindrical operating cavity with open and closed ends,
- a cylindrical piston assembly extending through the open end of the cylinder into sealing engagement with the cavity and having a reaction surface adjacent the cylinder closed end, a stepped bore including a second and a smaller third cavities,
- means connecting the actuator to the brake such that extension of the piston from the cylinder applies the brake and retraction of the piston within the cylinder releases the brake,
- a first hydraulic supply for admitting pressurized hydraulic fluid through the cylinder into the operating cavity between the closed end thereof and the piston assembly reaction surface to exert a first hydraulic extension force which extends the piston assembly and applies the brake to provide a service brake,
- first spring means exerting a retracting force smaller than the hydraulic extension force on the piston assembly,
- a hollow parking brake piston having an inner surface and a cylindrical outer surface sealingly received within the second cavity,
- a second hydraulic supply for admitting pressurized hydraulic fluid through the piston assembly into the second cavity to extend the parking brake piston to react against the cylinder closed end to extend the piston assembly with a second hydraulic extension force and apply the brake to provide a parking brake,
- a mechanical lock for locking the parking brake piston to maintain the parking brake applied upon removal of hydraulic pressure, comprising
  - a carrier member attached to the piston assembly for movement therewith and located within the second cavity,
  - a plurality of circumferentially-spaced ramps formed on the carrier member and tapered inwardly toward the direction of parking brake piston extension,
  - a rotary locking member wedged between the parking brake piston inner surface and each ramp, and
  - second spring means biasing the rotary locking members into wedged position to lock the parking brake piston against retraction but permit its extension,
- a third hydraulic supply for admitting pressurized hydraulic fluid through the piston assembly to the third cavity, and
- an unlocking member including an operating piston sealingly received in the third cavity and responsive to pressurized hydraulic fluid to force the rotary locking members out of wedged position which unlocks the piston and enables retraction of the parking brake piston within the piston assembly.

9. The brake actuator of claim 8, including
- a gripper ring carried by the cylinder and gripping the exterior of the piston assembly with a friction force smaller than the hydraulic extension forces and greater than the retracting force,
- a first abutment on the cylinder engaged by the ring upon retraction for limiting retraction of the piston assembly and ring by the spring means,
- a second abutment on the cylinder engaged by the ring upon extension to limit extension of the ring by the hydraulic force while permitting continued movement of the piston assembly relative to the ring to apply the brake,
- whereby the limited retraction of the ring and the piston assembly provides brake slack, and movement of the piston assembly relative to the ring upon extension compensates for brake wear.

10. A brake actuator for operating a railway brake to provide both service and parking braking, comprising
- a cylinder having an operating cavity with open and closed ends,
- a piston assembly extending through the open end into the cavity and having a reaction surface adjacent the cylinder closed end,
- means connecting the actuator to the brake such that extension of the piston from the cylinder applies the brake and retraction of the piston within the cylinder releases the brake,
- a first hydraulic supply for admitting pressurized hydraulic fluid into the operating cavity between the closed end and the reaction surface to exert a first hydraulic extension force which extends the piston assembly and applies the brake to provide a service brake,
- spring means exerting a retracting force smaller than the hydraulic force on the piston assembly,
- a second cavity formed in the piston assembly,
- a parking brake piston received within the second cavity, a second hydraulic supply for admitting pressurized hydraulic fluid into the second cavity to extend the parking brake piston which extends the piston assembly with a second hydraulic extension force and applies the brake to provide a parking brake,
- a mechanical lock for locking the parking brake piston extended to maintain the parking brake applied upon removal of hydraulic pressure, and
- unlocking means for unlocking the parking brake piston which enables the spring means to retract the piston assembly and release the parking brake.

11. The brake actuator of claim 10, wherein
- the parking brake piston is cylindrical, having an outer surface engaging the walls of the second cavity and an inner surface,
- the mechanical lock comprises a carrier member attached to the piston assembly for movement therewith and located within the second cavity and a one-way clutch connecting the carrier member and the parking brake piston and being normally enabled to lock the parking brake piston against retraction but permit its extension, and
- the unlocking means comprises a third hydraulic supply for supplying pressurized hydraulic fluid, and an unlocking member movable relative to the carrier member, in response to the supply of pressurized hydraulic fluid by the third hydraulic supply, to unlock the piston by disabling the one-way clutch which enables retraction of the piston assembly.

12. The brake actuator of claim 10, wherein the parking brake piston is cylindrical, having an outer surface engaging the walls of the second cavity and an inner surface, and wherein the mechanical lock comprises
   a carrier member attached to the piston assembly for movement therewith and located within the second cavity,
   a ramp formed on the carrier member and tapered inwardly toward the direction of piston extension,
   a rotary locking member wedged between the parking brake piston inner surface and the ramp, and
   second spring means biasing the rotary locking member into wedged position to prevent retraction of the parking brake piston but permit its extension, and
   the unlocking means comprises
   a third hydraulic supply for supplying pressurized hydraulic fluid and
   an unlocking member movable relative to the carrier member in response to the supply of pressurized hydraulic fluid by the third hydraulic supply to move the rotary locking member out of wedged position to unlock the lock and enable retraction of the piston assembly.

13. The brake actuator of claim 12, wherein a plurality of ramps are formed on the carrier member in circumferentially spaced relation, a rotary locking member is located between the piston inner surface and each ramp, the second spring means is operative to bias each rotary locking member into wedged position, and the unlocking member is operable in response to the supply of pressurized hydraulic fluid to simultaneously move all of the rotary locking members out of wedged position.

14. The brake actuator of claim 13, wherein the rotary locking members are rollers.

15. The brake actuator of claim 13, wherein the rotary locking members are balls.

16. The brake actuator of claim 13, including
   a gripper ring carried by the cylinder and engaging the exterior of the piston assembly with a frictional force smaller than the hydraulic extension force, wherein the first spring means engages the ring with a force smaller than the hydraulic extension force,
   a first abutment on the cylinder engaged by the ring upon retraction for limiting retraction of the piston assembly and ring by the spring means,
   a second abutment on the cylinder engaged by the ring upon extension for limiting extension of the ring by the hydraulic force while permitting continued movement of the piston assembly to apply the brake,
   whereby the limited retracting movement of the ring provides brake slack, and movement of the piston assembly relative to the ring upon extension compensates for brake wear.

17. The brake actuator of claim 16, wherein the cylinder includes an annular groove peripherally located about the cavity adjacent its open end for cylinder the gripper ring, the groove having end surfaces comprising the first and second abutments which are spaced axially apart by a distance which is greater than the axial dimension of the gripper ring by an amount equal to brake slack.

18. The brake actuator of claim 10, wherein the effective area of the parking brake piston is less than 1/3 the effective area of the reaction surface of the piston assembly.

19. The brake actuator of claim 10, wherein the effective area of the parking brake piston is approximately ¼ the effective area of the reaction surface of the piston assembly.

20. A parking brake actuator having a cylinder, a piston carried by the cylinder, a hydraulic supply for admitting pressurized hydraulic fluid to the cylinder to extend the piston from the cylinder to apply a parking brake, spring means for retracting the piston within the cylinder upon removal of hydraulic pressure to release the parking brake, a mechanical lock for locking the piston in extended position to maintain the parking brake applied upon removal of hydraulic pressure, and unlocking means for disabling the mechanical lock to unlock the piston and enable retraction of the piston, characterized by the mechanical lock comprising
   an inner cylindrical surface carried by the piston,
   a carrier member carried within the piston and attached to the cylinder for movement therewith,
   a ramp formed on the carrier member and tapered inwardly toward the direction of extension,
   a rotary locking member wedged between the piston inner cylindrical surface and the ramp, and
   second spring means biasing the rotary locking member into wedged position to prevent retraction of the piston but permit its extension, and further characterized by the unlocking means comprising
   an unlocking member movable relative to the carrier member to move the rotary locking member out of wedged position, and
   second hydraulic supply means for supplying pressurized hydraulic fluid to cause the unlocking member to force the rotary locking member out of wedged position which enables the first spring means to retract the piston to release the brake.

21. The parking brake actuator of claim 20, wherein a plurality of ramps are formed on the carrier member in circumferentially spaced relation, a rotary locking member is located between the piston inner cylindrical and each ramp, the second spring means are operative to bias each rotary locking member into wedged position, and the unlocking member is operable in response to the supply of pressurized hydraulic fluid to simultaneously move all of the rotary locking members out of wedged position.

22. The parking brake actuator of claim 21, wherein the rotary locking members are rollers contoured to match the piston inner cylindrical surface, the ramps are circumferentially-spaced and contoured to match the roller contour, and the second spring means comprise
   a reaction ring mounted on the carrier member,
   a retainer of anti-friction material engaging each roller, and
   a compression spring confined between each retainer and the reaction ring.

23. The parking brake actuator of claim 21, wherein the rotary locking members are balls, the ramps comprise a conical surface on the carrier member, and the second spring means comprise
   a reaction ring mounted on the carrier member,
   a ball cage embracing the balls in circumferentially spaced relation around the conical surface and including a spring pocket for each ball, and a spring located in each spring pocket confined between the cage and the reaction ring.

24. The parking brake actuator of claim 21, wherein the rotary locking members are balls, the ramps comprise a conical surface on the carrier member, and the second spring means comprise a reaction ring mounted on the carrier member, a ball cage embracing the balls in circumferentially spaced relation around the conical surface and including a through spring pocket opposite each ball and a blind spring pocket intermediate each through pocket, and a plurality of springs, located in each through spring pocket engaging a ball and located in each blind pocket confined between the cage and the reaction ring, wherein the springs in the blind pockets bias the ball cage and the balls as a unit into wedging position, while the springs in the through pockets assure that each ball is biased into wedging position.

* * * * *